United States Patent
Chen et al.

(10) Patent No.: US 12,355,102 B2
(45) Date of Patent: Jul. 8, 2025

(54) METHOD OF MANUFACTURING A THIN FILM COMPOSITE SOLID ELECTROLYTE

(71) Applicant: UT-Battelle, LLC, Oak Ridge, TN (US)

(72) Inventors: Xi Chen, Oak Ridge, TN (US); Nancy J. Dudney, Oak Ridge, TN (US); Sergiy Kalnaus, Oak Ridge, TN (US); Max J. Palmer, Oak Ridge, TN (US); Andrew S. Westover, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 294 days.

(21) Appl. No.: 17/497,023

(22) Filed: Oct. 8, 2021

(65) Prior Publication Data

US 2022/0115693 A1 Apr. 14, 2022

Related U.S. Application Data

(60) Provisional application No. 63/089,039, filed on Oct. 8, 2020.

(51) Int. Cl.
*H01M 50/403* (2021.01)
*H01M 10/0525* (2010.01)
(Continued)

(52) U.S. Cl.
CPC ..... *H01M 50/446* (2021.01); *H01M 10/0525* (2013.01); *H01M 10/0565* (2013.01);
(Continued)

(58) Field of Classification Search
CPC ............. H01M 50/446; H01M 10/056; H01M 50/409; H01M 50/411;
(Continued)

(56) References Cited

U.S. PATENT DOCUMENTS

2007/0172739 A1* 7/2007 Visco ............... H01B 1/122
429/246
2009/0155678 A1* 6/2009 Less ................. H01M 50/46
429/231.95
(Continued)

FOREIGN PATENT DOCUMENTS

CN 103560220 A * 2/2014 ............. B05B 13/04

OTHER PUBLICATIONS

Liu et al., "Ionic Conductivity Enhancement of Polymer Electrolytes with Ceramic Nanowire Fillers", Nano Letters, 2015, pp. 2740-2745, vol. 15.
(Continued)

*Primary Examiner* — Jeremiah R Smith
(74) *Attorney, Agent, or Firm* — WARNER NORCROSS + JUDD LLP

(57) ABSTRACT

A method for manufacturing an improved thin film composite solid electrolyte is provided. The method includes spray coating an aqueous suspension of ceramic particles onto a substrate to form a ceramic thin film. The film is sintered to form a porous ceramic structure having an interconnected necked morphology that defines cavities. The cavities are backfilled with an polymer electrolyte, for example a crosslinkable poly(ethylene oxide) (PEO)-based polymer electrolyte. The resulting thin film composite solid electrolyte is highly ionically conductive and mechanically robust with good manufacturability, particularly suitable for, but not limited to lithium metal batteries. The present method represents a departure from conventional mixing-then-casting methods and instead includes the fabrication of a solid electrolyte having a high ceramic volume fraction, high ionic conductivity, low thickness, and good chemical stability with metallic lithium.

7 Claims, 1 Drawing Sheet

(51) Int. Cl.
*H01M 10/0565* (2010.01)
*H01M 50/409* (2021.01)
*H01M 50/414* (2021.01)
*H01M 50/434* (2021.01)
*H01M 50/446* (2021.01)

(52) U.S. Cl.
CPC ....... *H01M 50/403* (2021.01); *H01M 50/409* (2021.01); *H01M 50/414* (2021.01); *H01M 50/434* (2021.01); *H01M 2300/0082* (2013.01); *H01M 2300/0085* (2013.01)

(58) Field of Classification Search
CPC ..... H01M 50/414–426; H01M 50/434; H01M 50/403; H01M 10/052
See application file for complete search history.

(56) References Cited

U.S. PATENT DOCUMENTS

| | | | |
|---|---|---|---|
| 2011/0217585 A1* | 9/2011 | Wang | H01M 50/414 |
| | | | 118/620 |
| 2014/0038024 A1* | 2/2014 | Huang | H01M 50/44 |
| | | | 429/144 |
| 2015/0010804 A1* | 1/2015 | Laramie | H01M 4/1395 |
| | | | 429/144 |
| 2015/0162583 A1* | 6/2015 | Dadheech | H01M 50/417 |
| | | | 427/446 |
| 2017/0179472 A1* | 6/2017 | Allie | H01M 10/052 |
| 2017/0279101 A1* | 9/2017 | Sago | H01M 50/446 |
| 2017/0309956 A1* | 10/2017 | Park | H01M 4/587 |
| 2018/0145367 A1* | 5/2018 | Busacca | H01M 50/491 |
| 2018/0277827 A1* | 9/2018 | Kawakami | H01M 10/052 |
| 2019/0296308 A1* | 9/2019 | Antonopoulos | H01M 10/4235 |

OTHER PUBLICATIONS

Wang et al., "Rechargeble Solid-State Lithium Metal Batteries With Vertically Aligned Ceramic Nanoparticle/Polymer Composite Electrolyte", Nano Energy, 2019, pp. 205-212, vol. 60.

Zhai et al., "A Flexible Solid Composite Electrolyte with Vertically Aligned and Connected Ion-Conducting Nanoparticles For Lithium Batteries", Nano Letters, 2017, pp. 3182-3187, vol. 17.

* cited by examiner

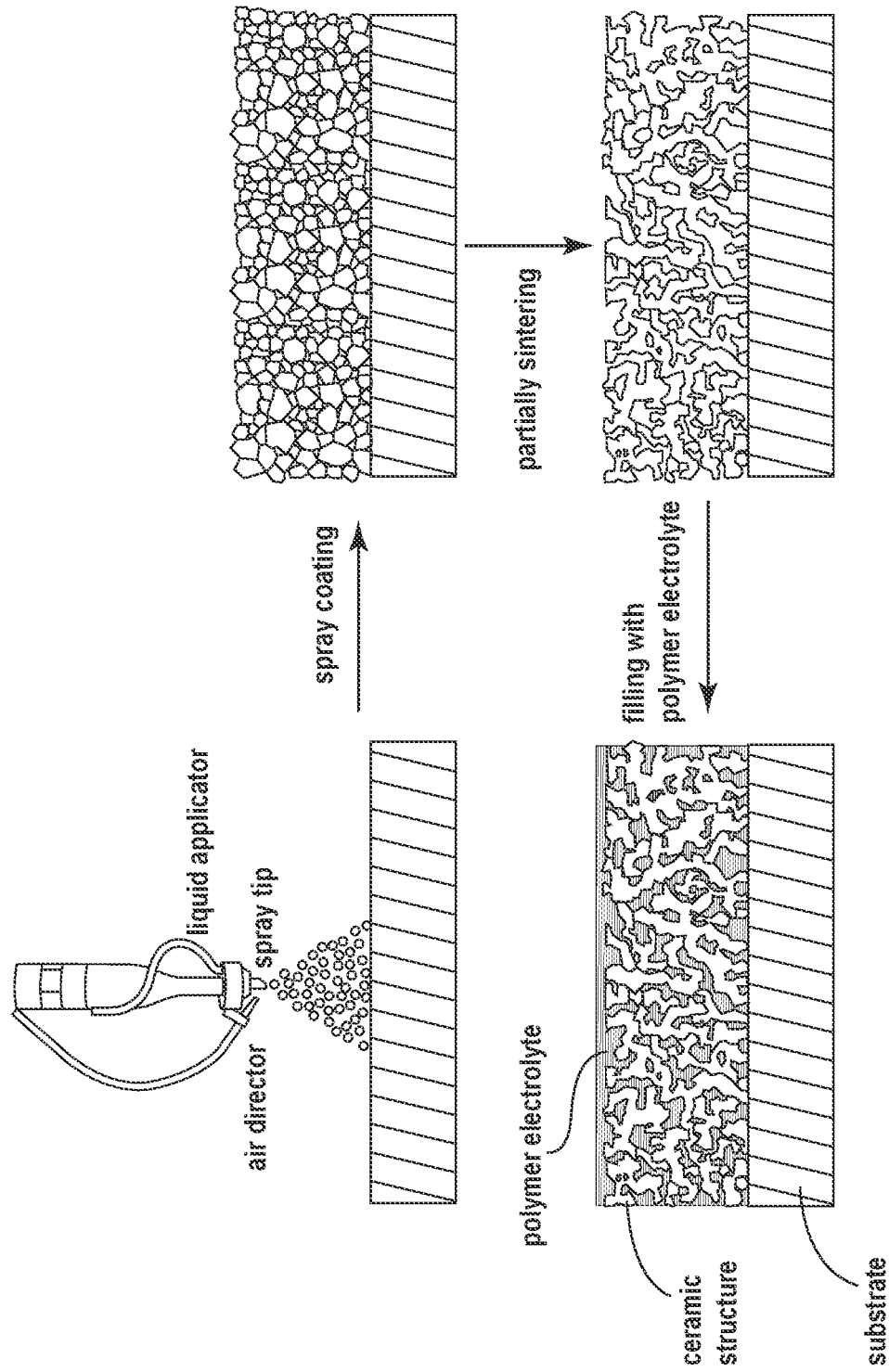

METHOD OF MANUFACTURING A THIN FILM COMPOSITE SOLID ELECTROLYTE

CROSS-REFERENCE TO RELATED APPLICATIONS

This application claims the benefit of U.S. Provisional Application 63/089,039, filed Oct. 8, 2020, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a method of manufacturing a thin film composite solid electrolyte for battery electrodes and other applications.

BACKGROUND OF THE INVENTION

Solid electrolytes are promising in enabling lithium metal to replace conventional graphite anodes and solid electrolytes, thereby significantly increasing the capacity and energy density of lithium-ion batteries. There are two broad classes of solid electrolytes: inorganic oxide or sulfide-based electrolytes and polymer-based electrolytes. Inorganic electrolytes offer excellent ionic conductivities (e.g., in a range of from $10^{-4}$ to $10^{-1}$ S/cm). Unfortunately, inorganic electrolytes suffer from brittleness and are difficult to process. In contrast, solid polymer electrolytes offer the advantages of flexibility, good adhesion to electrodes, and are relatively inexpensive. Despite their advantages, however, solid polymer electrolytes have suboptimal room-temperature ionic conductivity and insufficient strength to prevent lithium dendrite growth. Composite electrolytes combining inorganic ceramic electrolyte particles with a polymer electrolyte matrix have been considered as a solution, however while showing improved mechanical properties, composite electrolytes do not have efficient ion transport due to large interparticle contact resistance and insufficient particle-particle contact area.

SUMMARY OF THE INVENTION

A method for manufacturing an improved thin film composite solid electrolyte is provided. The method includes spray coating an aqueous suspension of ceramic particles onto a substrate to form a ceramic thin film. The film is sintered to form a porous ceramic structure having an interconnected necked morphology that defines cavities. The cavities are backfilled with a polymer electrolyte, for example a crosslinkable poly(ethylene oxide) (PEO)-based polymer electrolyte. The resulting thin film composite solid electrolyte is highly ionically conductive and mechanically robust with good manufacturability, particularly suitable for, but not limited to lithium metal batteries. The present method represents a departure from conventional mixing-then-casting methods and instead includes the fabrication of a solid electrolyte having a high ceramic volume fraction, high ionic conductivity, low thickness, and good chemical stability with metallic lithium.

These and other features of the invention will be more fully understood and appreciated by reference to the description of the embodiments and the drawings.

BRIEF DESCRIPTION OF THE DRAWING

FIG. 1 is an illustration of a method for manufacturing a thin film composite solid electrolyte.

DETAILED DESCRIPTION OF THE CURRENT EMBODIMENTS

As discussed herein, the current embodiments relate to a method for manufacturing a thin film composite solid electrolyte. As generally illustrated in FIG. 1, the method includes spray coating an aqueous suspension of ceramic particles onto a substrate to form a supported ceramic thin film, sintering the ceramic thin film to form a ceramic structure having an interconnected necked morphology, and filling the internal cavities of the ceramic structure with a polymer electrolyte. Each step is separately discussed below.

The method first includes spray coating an aqueous suspension of ceramic particles onto a substrate. Typically, the ceramic particles are ion-conducting ceramic particles. The ceramic particles have a mean particle diameter of from 0.1 μm to 10 μm as determined by Laser Diffraction Particle Size Analysis (LDPSA). Spray coating is performed using an automatic spraycoater. The automatic spraycoater includes a spray nozzle moving over a preprogrammed area of the substrate, optionally in multiple passes over the substrate. The aqueous suspension includes ceramic particles in an amount of under 15 wt. %, alternatively under 10 wt. %, alternatively under 5 wt. %, alternatively under 3 wt. %. During the step of spray coating the aqueous suspension of ceramic particles onto the substrate, the substrate can be heated to a temperature of 70° C. to 150° C., alternatively 90° C. to 130° C., alternatively 100° C. to 120° C.

The method then includes sintering the ceramic thin film to form a ceramic structure having an interconnected necked morphology defining internal cavities. In some embodiments, the film is only partially sintered, such that the resulting ceramic structure has a higher degree of porosity and the cavities are more interconnected, and have a greater pore size. A partially sintered ceramic structure is defined as any ceramic structure having a density of less than 90%. Generally, there are no structural or crystallinity changes during the sintering process, but only morphological changes. The step of sintering the ceramic thin film is conducted at a temperature of 750° C. to 1250° C., alternatively 800° C. to 1200° C., alternatively 900° C. to 1100° C., alternatively 950° C. to 1050° C. In certain embodiments, the step of sintering the ceramic thin film is conducted for 1 to 5 hours, alternatively for 2 to 4 hours, alternatively for 2.5 to 3.5 hours, alternatively for 3 hours.

The polymer electrolyte can be either non-crosslinkable or crosslinkable. When the polymer electrolyte is crosslinkable the method involves the preparation of the polymer electrolyte and a further optional curing step. The method further includes preparing the polymer electrolyte composition. Preparing the polymer electrolyte composition can include combining an amine-functional compound and an epoxy-functional compound to form a mixture. The amine-functional compound and the epoxy-functional compound are present in the mixture in a volume ratio of 1:10 to 10:1, alternatively 5:10 to 10:5, alternatively 7:10 to 10:7, alternatively 9:10 to 10:9, alternatively 9:10. Preparing the polymer electrolyte composition can include adding a lithium salt to the amine-functional and epoxy-functional compounds. Generally, the lithium salt and the amine-functional and epoxy-functional compounds together are present a volume ratio of from 7:1 to 1:7, alternatively 5:1 to 1:5, alternatively 4:1 to 1:4, alternatively 1:4. In exemplary embodiments, the amine-functional compound is O,O'-Bis(2-aminopropyl) polypropylene glycol-block-polyethylene glycol-block-polypropylene glycol, the epoxy-functional compound is poly(ethylene glycol) diglycidyl ether, and the lithium salt is lithium bis-trifluoromethanesulfonimide.

The method then includes filling the cavities of the ceramic structure with the polymer electrolyte. Filling the cavities is achieved using capillary action to draw the polymer electrolyte into the cavities of the ceramic structure, optionally while within a vacuum oven, optionally with the aid of a solvent. For example, the ceramic structure and polymer electrolyte can be held under a reduced atmosphere for 2 to 6 hours, alternatively 3 to 5 hours, alternatively 4 hours, optionally while at room temperature. The method then optionally includes curing the polymer electrolyte present in the cavities of the ceramic structure. Curing the electrolyte polymer mixture is performed in a vacuum furnace at an elevated temperature for a predetermined time period. Curing the electrolyte polymer can be performed at 70° C. to 130° C., 80° C. to 120° C., or 90° C. to 110° C., optionally for 4 to 48 hours, for 8 to 24 hours, 12 to 20 hours, or 14 to 18 hours.

The above method is well suited for manufacturing an electrode comprising a thin film composite solid electrolyte supported on a substrate, the thin film composite solid electrolyte including a polymer electrolyte disposed within the internal cavities of a ceramic structure. The composite solid electrolyte has a thickness of less than 50 µm, alternatively less than 30 µm, alternatively less than 20 µm. The composite solid electrolyte has a ceramic volume fraction of more than 50 vol. %, alternatively more than 55 vol. %. In some embodiments, the composite solid electrolyte has a ceramic weight fraction of more than 50 wt. %, alternatively more than 60 wt. %, alternatively more than 70 wt. %, alternatively more than 75 wt. %. In particular embodiments, the composite solid electrolyte comprises a polymer-rich layer. In specific embodiments, the polymer-rich layer (i) has a thickness of 1 to 5 µm, alternatively 2 to 4 µm, alternatively 3 µm, or (ii) defines an exposed surface of the composite solid electrolyte. In some embodiments, the polymer electrolyte comprises a plasticizer. In particular embodiments, the plasticizer is tetraethylene glycol dimethyl ether (TEGDME). The substrate may be any high temperature (i.e., greater than 850° C.) stable material. In exemplary embodiments, the substrate is silicon or alumina. Alternative examples include battery electrodes, nickel, titanium, platinum, and other high temperature stable substrates To reiterate, the thin film composite solid electrolyte comprises a porous ceramic structure, which is optionally ion-conducting, supported on a substrate, i.e., the ceramic structure participates in lithium ion transport. The ceramic particles and/or ceramic structure can include doped-lithium aluminum titanium phosphate (LATP), lithium lanthanum zirconium oxide (LLZO), lithium lanthanum titanate (LLTO) or combinations thereof. In exemplary embodiments, the ceramic particles and/or ceramic structure comprise, alternatively consist essentially of, alternatively consist of, LATP. In specific embodiments, the ceramic structure has an interconnected necked morphology. An interconnected necked morphology is a microstructure defined by necks extending between ceramic nuclei that connect the ceramic particles and form a larger ceramic structure. In certain embodiments, the cavities are interconnected such that the ceramic structure defines a void area.

As noted above, the thin film composite solid electrolyte includes a polymer electrolyte disposed within the internal cavities of the porous ceramic structure. The polymer electrolyte can be a polymer electrolyte such as poly(ethylene oxide) with salts or polymer electrolyte/plasticizer mixtures. The polymer electrolyte can be a cross-linkable polymer electrolyte. For example, the polymer electrolyte comprises O,O'-Bis(2-aminopropyl) polypropylene glycol-block-polyethylene glycol-block-polypropylene glycol ("Jeffamine"), poly(ethylene glycol) diglycidyl ether ("PEGDGE"), lithium bis-trifluoromethanesulfonimide ("LiTFSI"), or combinations thereof. In some embodiments, the cross-linkable electrolyte polymer mixture has epoxy-amine functionality. In specific embodiments, Jeffamine and PEGDGE react with each other to form a cross-linked polymer electrolyte.

EXAMPLE

The present method is further described in connection with the following laboratory example, which is intended to be non-limiting.

A 2 wt. % aqueous suspension of doped-lithium aluminum titanium phosphate (LICG™, Ohara Corporation) powders was spray coated onto an alumina substrate at 110° C. using an automatic spraycoater (Prism-400 BT from Ultrasonic Systems, Inc.). The spray nozzle of the automatic spray coater rastered in a programmed area over the heated alumina substrate while the ceramic particles were sprayed out of the nozzle, forming a very thin layer on the substrate. After the spray nozzle completed rastering the programmed area once, the film was allowed to dry for one minute. The spraying and drying process was repeated until the desired thickness (~20 µm) was reached. The spray nozzle width, nozzle speed, and flow rate were set at 5 mm, 50 mm/sec, and 1 mL/min, respectively. The thin film was then sintered at 1000° C. for three hours under argon gas flow to form an interconnected necked structure. The furnace temperature increased at a ramp rate of 10° C./min and was cooled naturally.

O,O'-Bis(2-aminopropyl) polypropylene glycol-block-polyethylene glycol-block-polypropylene glycol (Jeffamine ED-900, Sigma-Aldrich) and poly(ethylene glycol) diglycidyl ether (PEGDGE, average $M_n$ 500, Sigma-Aldrich) were mixed in a weight ratio of 9:10 at room temperature under constant stirring for 2 hours. Lithium bis-trifluoromethanesulfonimide (LiTFSI, 3M) was then added to the polymer electrolyte and stirred for another 2 hours, until it was fully dissolved. The weight ratio of LiTFSI to Jeffamine+PEGDGE was 1:4. The liquid polymer electrolyte was dispensed onto the sintered ceramic thin film solid electrolyte. The thin film solid electrolyte was then placed in a vacuum oven. The filling completed at room temperature under vacuum for 4 hours and the polymer electrolyte was cured at 100° C. under vacuum for 16 hours. The resulting thin film composite solid electrolyte was then transferred into an argon glovebox and dried further inside the glovebox in a vacuum furnace at 80° C. for 16 hours. The finished exemplary thin film composite solid electrolyte had thickness below 25 µm. The thin film composite solid electrolyte exhibited a high ceramic volume fraction (ca. 77 wt. % and 61 vol. %) and a room temperature ionic conductivity ($3.5 \times 10^{-5}$ S/cm at 20° C.).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for manufacturing a thin film composite solid electrolyte, said method comprising:

spray coating an aqueous suspension of ceramic particles onto a substrate to form a ceramic thin film while the substrate is heated to a temperature of 70° C. to 150° C., the aqueous suspension including ceramic particles in an amount of under 15 wt. %, the ceramic particles having a mean particle diameter of 0.1 μm to 10 μm;

sintering the ceramic thin film under argon gas at a temperature of 750° C. to 1250° C. for 1 to 5 hours to form a ceramic structure, the ceramic structure having an interconnected necked morphology that defines cavities;

preparing a polymer electrolyte by combining an amine-functional compound and an epoxy-functional compound with a weight ratio of 9:10, wherein the amine-functional compound includes O,O'-Bis(2-aminopropyl) polypropylene glycol-block-polyethylene glycol-block-polypropylene glycol, and wherein the epoxy-functional compound includes poly(ethylene glycol) diglycidyl ether;

dissolving a lithium salt in the polymer electrolyte; and filling the cavities of the ceramic structure with the polymer electrolyte in a reduced atmosphere by capillary action for 2 to 6 hours and thereafter curing the polymer electrolyte at 70° C. to 130° C. for 4 to 48 hours to form a thin film composite electrolyte having a thickness of less than 50 μm and a ceramic weight fraction of more than 60 wt. %.

2. The method of claim 1, wherein the ceramic particles are ion-conducting.

3. The method of claim 1, wherein the polymer electrolyte has lithium stability.

4. The method of claim 1, wherein the polymer electrolyte is cross-linkable.

5. The method of claim 1, wherein the step of spray coating the aqueous suspension of ceramic particles onto the substrate is performed using an automatic spraycoater.

6. The method of claim 5, wherein the step of spray coating comprises a spray nozzle of the automatic spraycoater moving over a preprogramed area of the substrate while the ceramic particles are sprayed from the spray nozzle.

7. The method of claim 6, wherein the spraycoater makes multiple passes over the preprogramed area over the substrate.

* * * * *